(12) United States Patent
Talavasek et al.

(10) Patent No.: US 10,696,355 B2
(45) Date of Patent: *Jun. 30, 2020

(54) BICYCLE FRAME WITH BATTERY MOUNT

(71) Applicant: Specialized Bicycle Components, Inc., Morgan Hill, CA (US)

(72) Inventors: Jan Talavasek, Knonau (CH); Vincent Patureau, Zurich (CH); Marco Sonderegger, Benzenschwil (CH); Marc Pallure, Zug (CH); Brandon Dale Sloan, Morgan Hill, CA (US); Joseph Edward Buckley, Santa Cruz, CA (US); Daniel Lentz, San Jose, CA (US); Jamie Stafford, Morgan Hill, CA (US)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/878,595

(22) Filed: Jan. 24, 2018

(65) Prior Publication Data

US 2018/0148128 A1 May 31, 2018

Related U.S. Application Data

(63) Continuation of application No. 15/816,181, filed on Nov. 17, 2017, now abandoned, and a continuation of
(Continued)

(51) Int. Cl.
*B62M 6/40* (2010.01)
*B62M 6/90* (2010.01)
(Continued)

(52) U.S. Cl.
CPC ............... *B62M 6/55* (2013.01); *B62K 19/18* (2013.01); *B62K 19/34* (2013.01); *B62K 19/36* (2013.01);
(Continued)

(58) Field of Classification Search
CPC . B62M 6/40; B62M 6/90; B62M 6/55; B62K 19/36; B62K 19/34
See application file for complete search history.

(56) References Cited

U.S. PATENT DOCUMENTS 6,016,882 A 1/2000 Ishikawa
6,148,944 A 11/2000 Adomi et al.
(Continued)

FOREIGN PATENT DOCUMENTS

EP 0686522 12/1995
EP 0686550 12/1995
(Continued)

OTHER PUBLICATIONS

European Patent Office action for Application No. 16176127.5 dated Nov. 4, 2019 (5 pages).

*Primary Examiner* — Anne Marie M Boehler
(74) *Attorney, Agent, or Firm* — Michael Best & Friedrich LLP

(57) ABSTRACT

A bicycle comprises front and rear wheels, a frame supported on the front and rear wheels and including a frame mount, and a battery including a battery mount engaged with the frame mount. One of the battery mount and the frame mount includes a depression and the other of the battery mount and the frame mount includes a boss positioned in the depression. Preferably, depression comprises a slot, and the slot can include a resilient material to securely hold the boss. The boss can comprise an eccentric boss. Preferably, the battery mount is positioned adjacent one end of the battery, and an opposite end of the battery includes an opening. In this embodiment, the bicycle further comprises a mounting pin positioned through the opening and through a portion of
(Continued)

the frame to secure the opposite end of the battery to the frame.

17 Claims, 12 Drawing Sheets

Related U.S. Application Data application No. 15/816,177, filed on Nov. 17, 2017, now Pat. No. 10,518,841, and a continuation of application No. 15/816,162, filed on Nov. 17, 2017, now abandoned, which is a continuation of application No. 15/482,949, filed on Apr. 10, 2017, now abandoned, which is a continuation of application No. 14/752,313, filed on Jun. 26, 2015, now Pat. No. 9,616,966.

(51) Int. Cl.

| | | |
|---|---|---|
| *B62M 6/55* | (2010.01) | |
| *B62K 19/34* | (2006.01) | |
| *B62K 19/18* | (2006.01) | |
| *B62M 9/00* | (2006.01) | |
| *B62K 19/36* | (2006.01) | |
| *B62K 25/28* | (2006.01) | |

(52) U.S. Cl.
CPC ............... *B62K 25/28* (2013.01); *B62M 6/40* (2013.01); *B62M 9/00* (2013.01); *B62M 2009/007* (2013.01)

(56) References Cited

U.S. PATENT DOCUMENTS

| | | | |
|---|---|---|---|
| 6,276,479 B1 | 8/2001 | Suzuki et al. | |
| 7,117,966 B2 | 10/2006 | Kohda et al. | |
| 7,393,125 B1 | 7/2008 | Lai | |
| 7,934,576 B2* | 5/2011 | Munksoe | ............... B62K 11/00 |
| | | | 180/220 |
| 8,413,947 B2* | 4/2013 | Chiang | ................... B62M 6/90 |
| | | | 248/553 |
| 8,469,381 B2 | 6/2013 | Dodman et al. | |
| 8,651,212 B2 | 2/2014 | Vincenz | |
| 8,979,110 B2 | 3/2015 | Talavasek et al. | |
| 9,580,141 B2* | 2/2017 | Talavasek | ............... B62M 6/90 |
| 2005/0211488 A1 | 9/2005 | Gore et al. | |
| 2008/0179858 A1 | 7/2008 | Chen | |
| 2010/0133778 A1 | 6/2010 | Munksoe | |
| 2013/0241170 A1* | 9/2013 | Talavasek | ............... B62M 6/90 |
| | | | 280/279 |
| 2014/0210318 A1 | 7/2014 | Yao | |
| 2016/0167736 A1 | 6/2016 | Arbour | |

FOREIGN PATENT DOCUMENTS

| | | | |
|---|---|---|---|
| EP | 0822135 | 2/1998 | |
| JP | 10-181651 | * 7/2007 | ............. B62M 1/04 |
| WO | 1999026837 | 6/1999 | |
| WO | 2012123455 | 9/2012 | |

* cited by examiner

BICYCLE FRAME WITH BATTERY MOUNT

CROSS-REFERENCE TO RELATED APPLICATIONS

This application is a continuation of co-pending U.S. patent application Ser. No. 15/816,181, filed on Nov. 17, 2017, and a continuation of co-pending U.S. patent application Ser. No. 15/816,177, filed on Nov. 17, 2017, and a continuation of co-pending U.S. patent application Ser. No. 15/816,162, filed on Nov. 17, 2017, each of which is a continuation of U.S. patent application Ser. No. 15/482,949, filed on Apr. 10, 2017, which is a continuation of U.S. patent application Ser. No. 14/752,313, filed on Jun. 26, 2015, now U.S. Pat. No. 9,616,966, the entire contents of all of which are incorporated herein by reference.

BACKGROUND

The present invention relates to bicycle frames and specifically to a bicycle frame that is adapted to support a battery.

It is known to provide a bicycle with an electric motor and battery in order to supplement the pedaling power provided by the user. Such electric motors and batteries can be secured to or incorporated into the bicycle frame.

SUMMARY

The present invention provides a bicycle comprising front and rear wheels, a frame supported on the front and rear wheels and including a frame mount, and a battery including a battery mount engaged with the frame mount. One of the battery mount and the frame mount includes a depression and the other of the battery mount and the frame mount includes a boss positioned in the depression. The depression is designed to receive the boss at multiple locations to accommodate slight differences in a length of the battery. Preferably, depression comprises a slot, and the slot can include a resilient material to securely hold the boss.

In one embodiment, the boss comprises an eccentric boss. For example, the boss can have a first boss width that is insertable into the depression/slot when the battery is in a first orientation, and the boss can further have a second boss width larger than the first boss width and creating an interference fit.

In another embodiment, the battery mount is positioned adjacent one end of the battery, and an opposite end of the battery includes an opening. In this embodiment, the bicycle further comprises a mounting pin positioned through the opening and through a portion of the frame to secure the opposite end of the battery to the frame. The distance from the opening to the battery mount defines the length of the battery.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
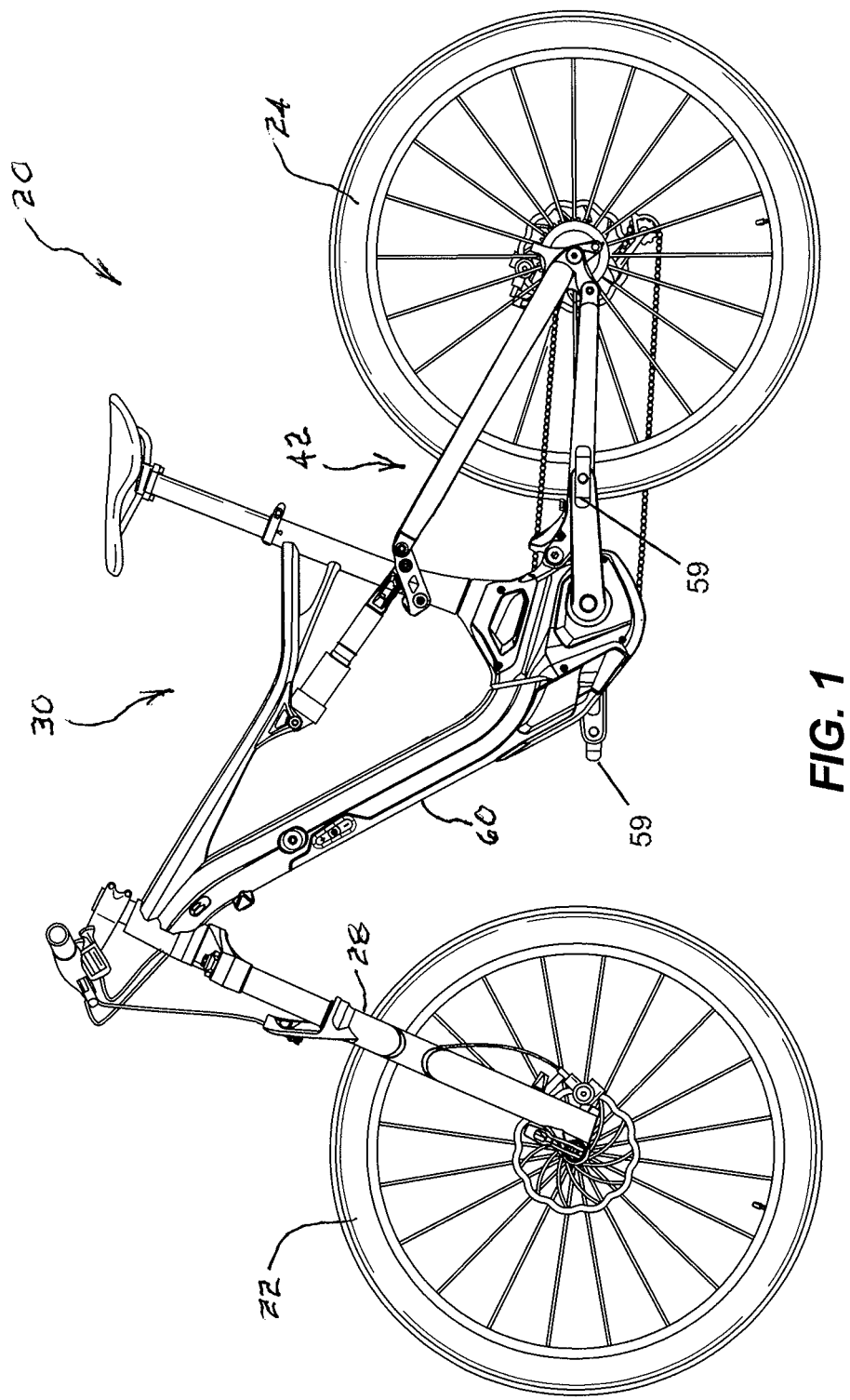
FIG. 1 is a side view of a bicycle incorporating features of the present invention.
Figure 2:
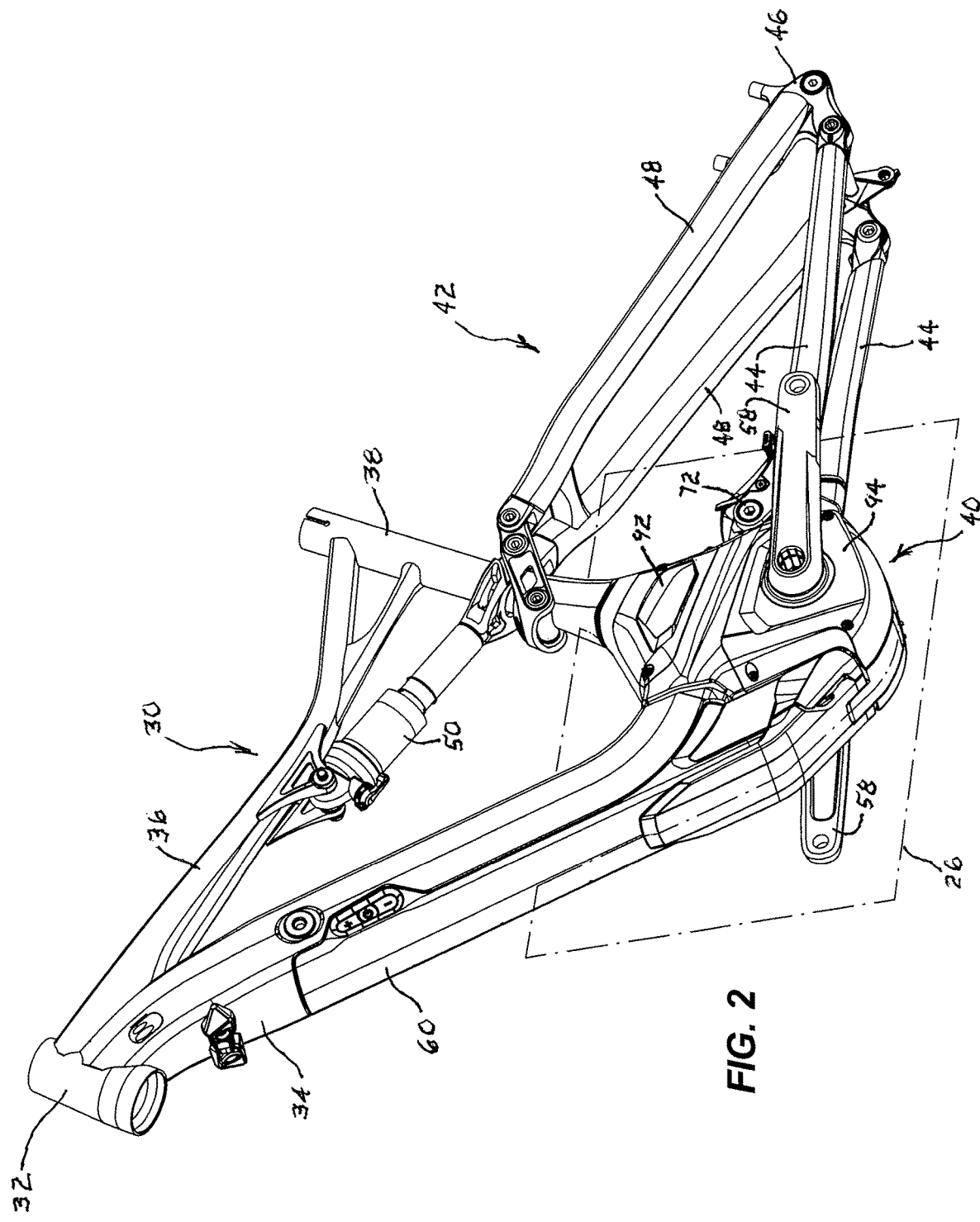
FIG. 2 is a perspective view of a bicycle frame assembly of the bicycle shown in FIG. 1.
Figure 3:
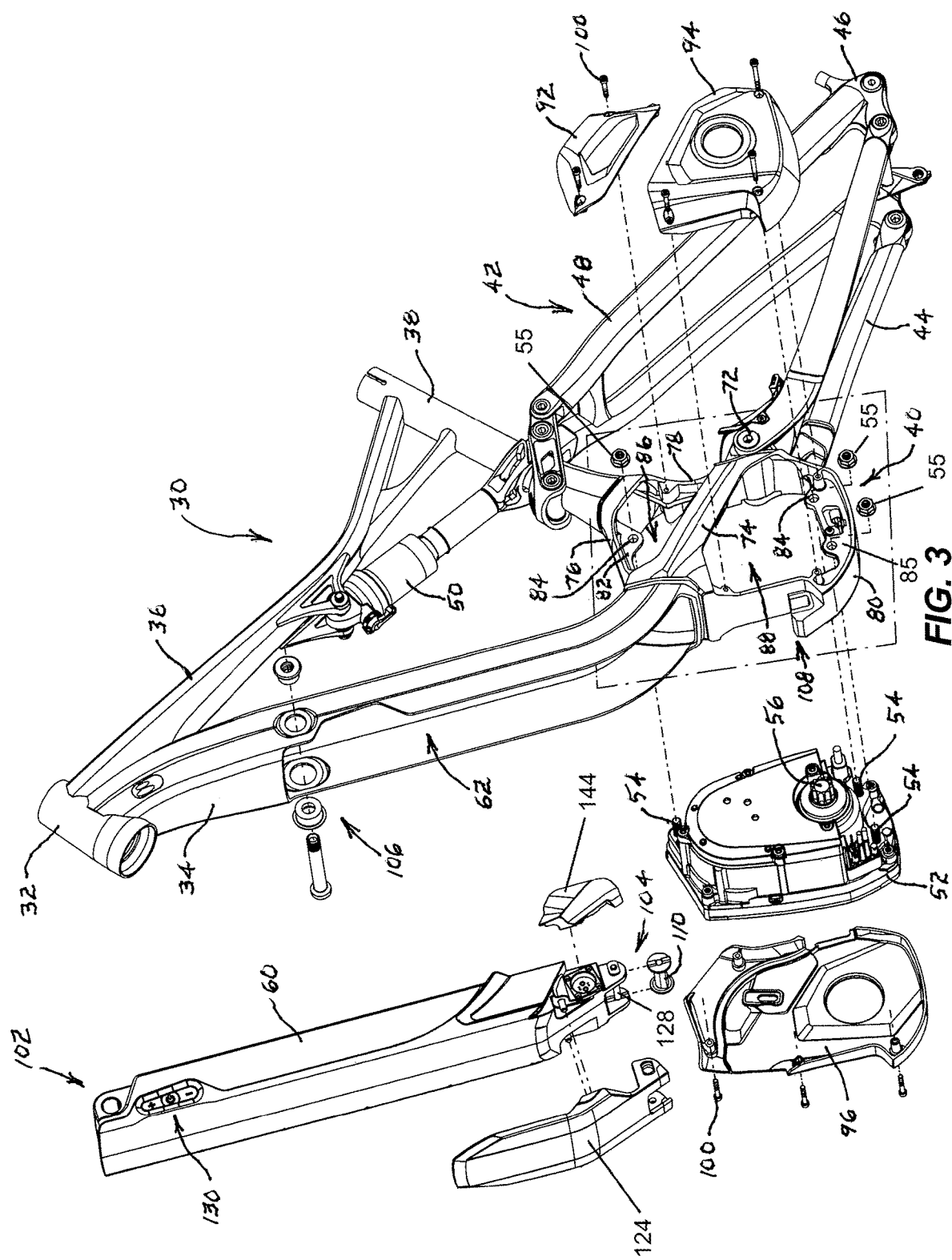
FIG. 3 is a partially exploded view of the bicycle frame assembly of FIG. 2.

FIGS. 1-3 illustrate a bicycle 20 embodying the present invention. The illustrated bicycle 20 includes a front wheel 22 and a rear wheel 24 that cooperatively define a central plane 26 and forward and rearward directions. A front fork 28 is supported by the front wheel 22, and a frame 30 is supported by the front fork 28 and the rear wheel 24. The illustrated frame 30 includes a head tube 32 rotationally coupled to the front fork 28, a down tube 34 extending downward and rearward from the head tube 32, a top tube 36 extending rearward from the head tube 32, a seat tube 38 extending downward from the top tube 36, and a motor mount 40 connecting the down tube 34 and the seat tube 38. The frame 30 further comprises a rear suspension assembly 42 including chainstays 44, rear wheel mounts 46, seat stays 48, and a rear shock 50, the functions of which are well known in the art.

The illustrated bicycle 20 further includes an electric motor 52 adapted to provide power to the bicycle 20. The illustrated electric motor 52 includes three mounting studs 54 for securing the electric motor 52 to the frame 30 via mounting nuts 55. The electric motor 52 further includes a drive shaft 56 connected to left and right cranks 58 that are adapted to receive corresponding pedals 59 that facilitate pedaling of the bicycle 20 by a user. Power is provided to the electric motor 52 via a battery 60 mounted within a tube recess 62 in the down tube 34, as explained below in more detail.

Figure 4:
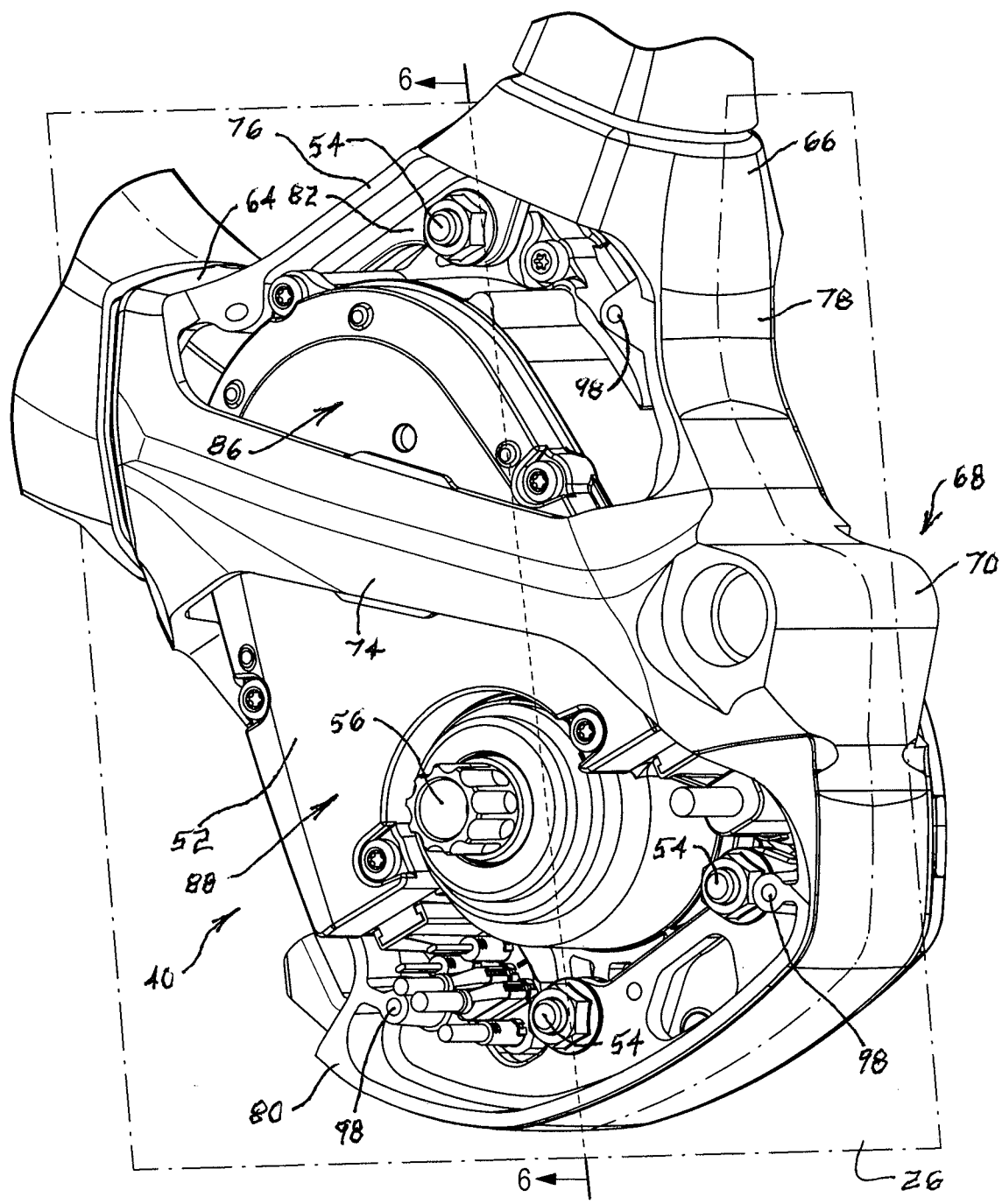
FIG. 4 is an enlarged perspective view of a lower portion of a frame of the bicycle of FIG. 1.

As best seen in FIG. 4, the motor mount 40 includes a down tube mount 64 coupled to the down tube 34, a seat tube mount 66 coupled to the seat tube 38, and a chainstay mount 68 coupled to the chainstays 44. The illustrated down tube mount 64 and seat tube mount 66 are welded to the down tube 34 and seat tube 38, respectively, but any suitable connection (e.g., bonding, fastening, or unitary construction) will suffice. The illustrated chainstay mount 68 comprises a pivot mount 70 for pivotally connecting the motor mount 40 to the chainstays 44 using a pivot shaft 72.

Figure 5:
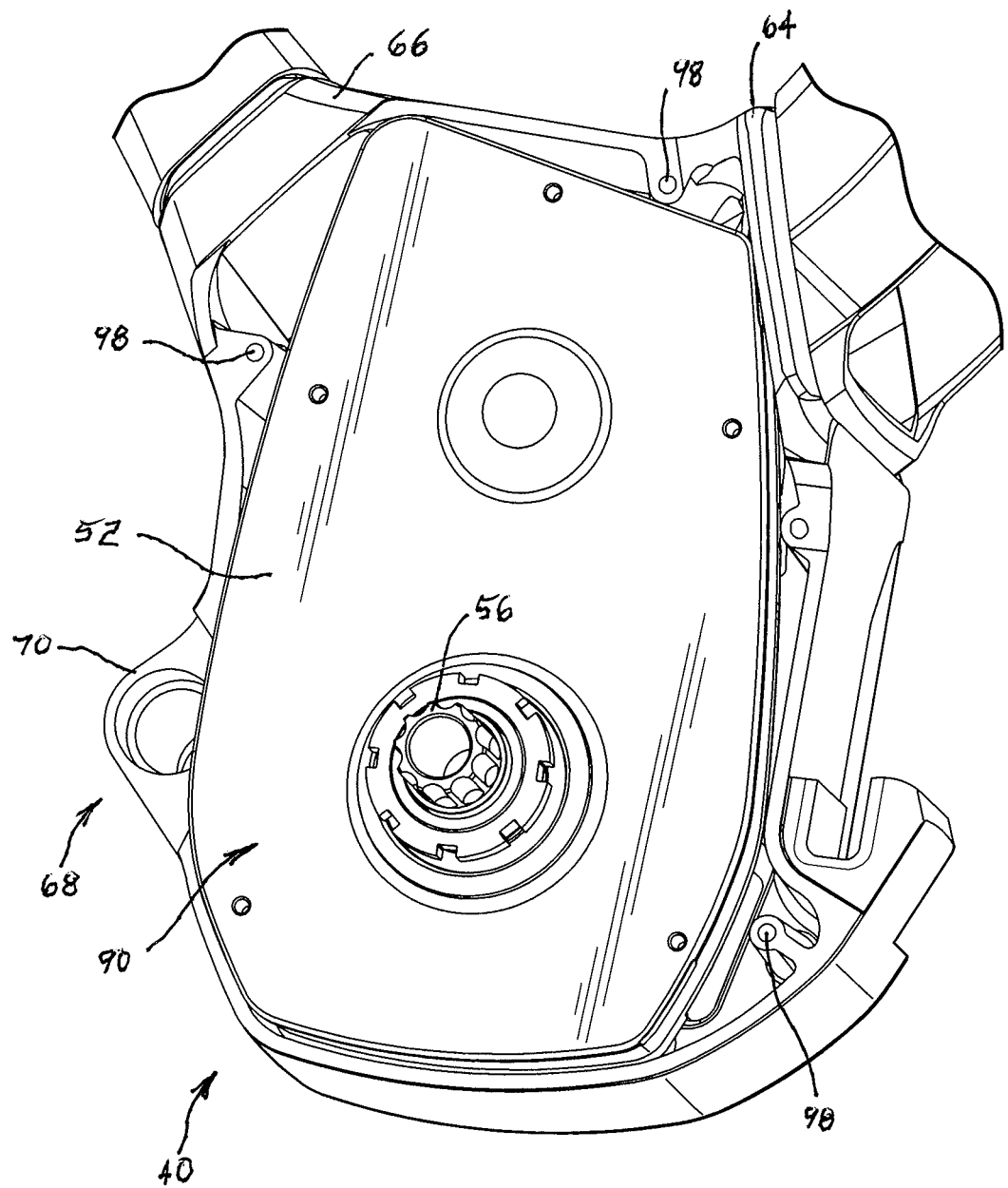
FIG. 5 is a right side view of a lower portion of the frame of FIG. 4.

The motor mount 40 further includes a side brace 74 connecting the down tube mount 64 to the chainstay mount 68 along the left side of the electric motor 52. As best shown in FIGS. 3-4, the side brace 74 is positioned to structurally and visually extend from the down tube 34 directly toward the chainstay mount 68. As shown in FIG. 5, the right side of the motor mount 40 does not include a side brace 74 and is completely open to facilitate insertion and removal of the electric motor 52 from the motor mount 40.

Figure 6:
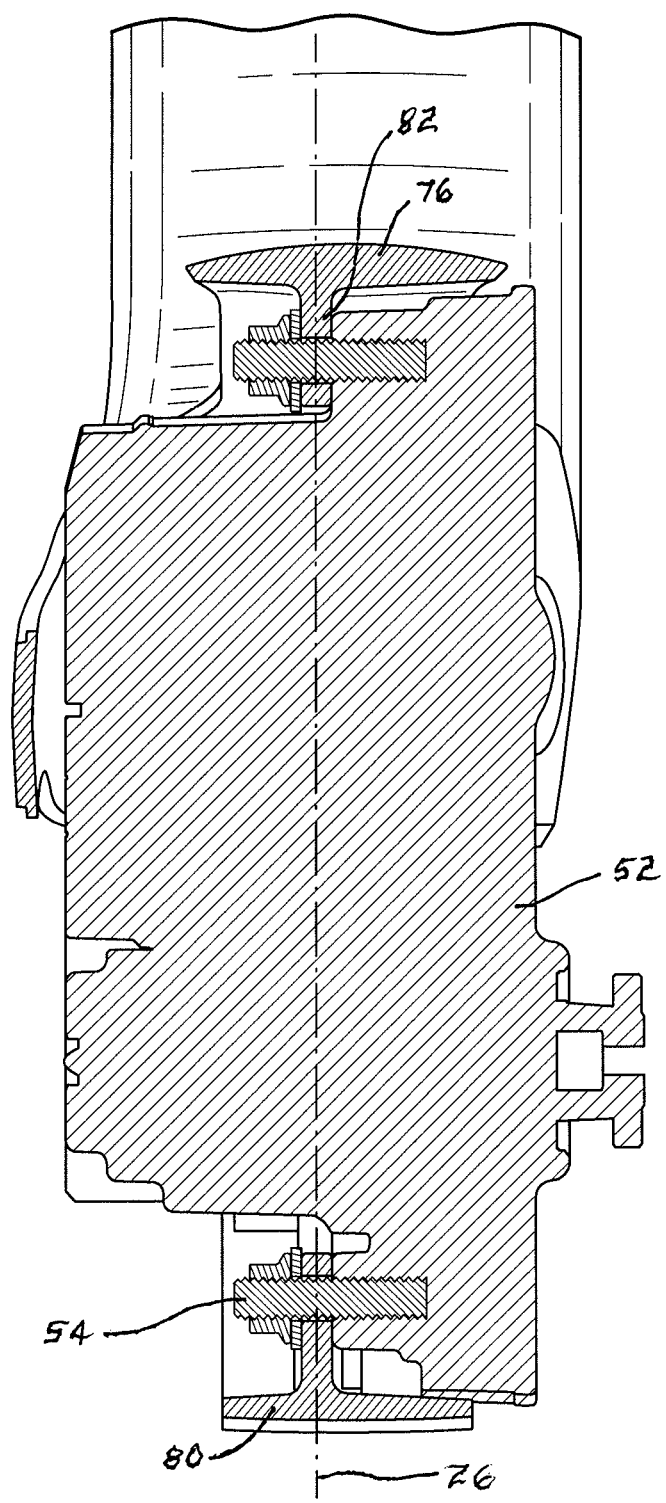
FIG. 6 is a section view taken along line 6-6 in FIG. 4.

Referring to FIGS. 3 and 4, the motor mount 40 further includes an upper support 76 connecting the down tube mount 64 with the seat tube mount 66, a rear support 78 connecting the seat tube mount 66 with the chainstay mount 68, and a lower support 80 connecting the down tube mount 64 with the chainstay mount 68. As illustrated in FIGS. 3, 4, and 6, the upper support 76 includes an upper flange 82 aligned with the central plane 26 and including a flange opening 84 adapted to receive one of the mounting studs 54 in order to facilitate attachment of the electric motor 52 to the motor mount 40 by the mounting nuts 55. Similarly, the lower support 80 includes a lower flange 85 aligned with the central plane 26 and including two flange openings 84 adapted to receive two of the mounting studs 54 in order to facilitate attachment of the electric motor 52 to the motor mount 40. As explained above and illustrated in the drawings, the combination of the down tube mount 64, the upper support 76 the seat tube mount 66, the rear support 78, the chainstay mount 68, and the lower support 80 provides complete enclosure of the electric motor 52 along the central plane 26 of the bicycle 20. This arrangement provides structural integrity to the bicycle frame 30 and also helps to protect the electric motor 52 from damage that could be caused by impact of the bicycle 20 with other objects (e.g., rocks or logs). This arrangement also utilizes the electric motor 52 as a stressed member to further improve the strength and rigidity of the bicycle frame 30.

As illustrated in FIGS. 3-5 and further explained above, the structural arrangement of the motor mount 40 results in an upper left opening 86, a lower left opening 88, and a right opening 90. These openings are fitted with an upper left cover 92, a lower left cover 94 and a right cover 96, respectively. Each of the upper support 76, lower support 80, and rear support 78 includes threaded openings 98 for receiving threaded fasteners 100 that attach the covers to the motor mount 40. The covers protect the electric motor 52 from damage and debris infiltrating the electric motor 52.

Figure 7:
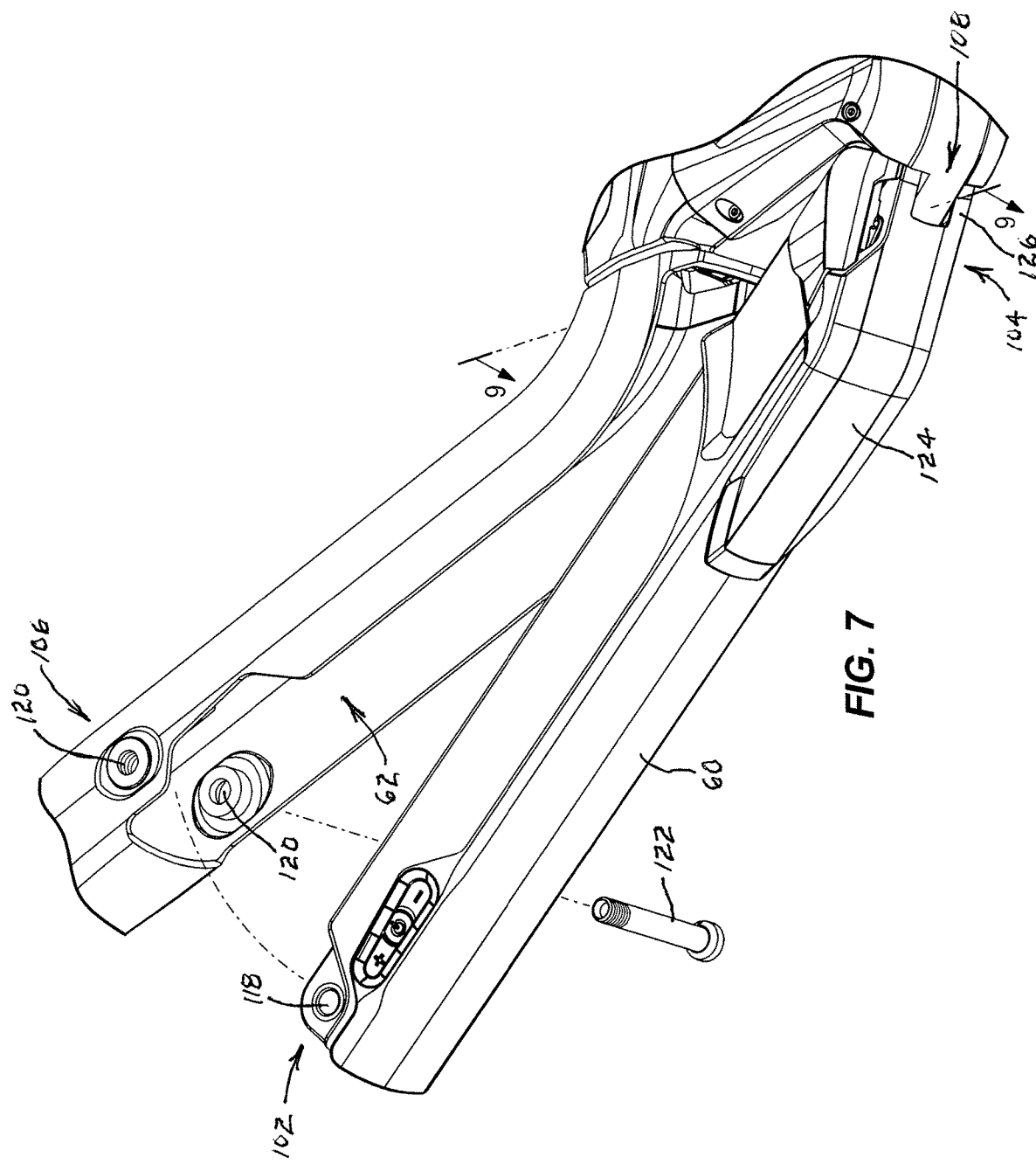
FIG. 7 is a perspective view of the battery in a partially-attached position.
Figure 8:
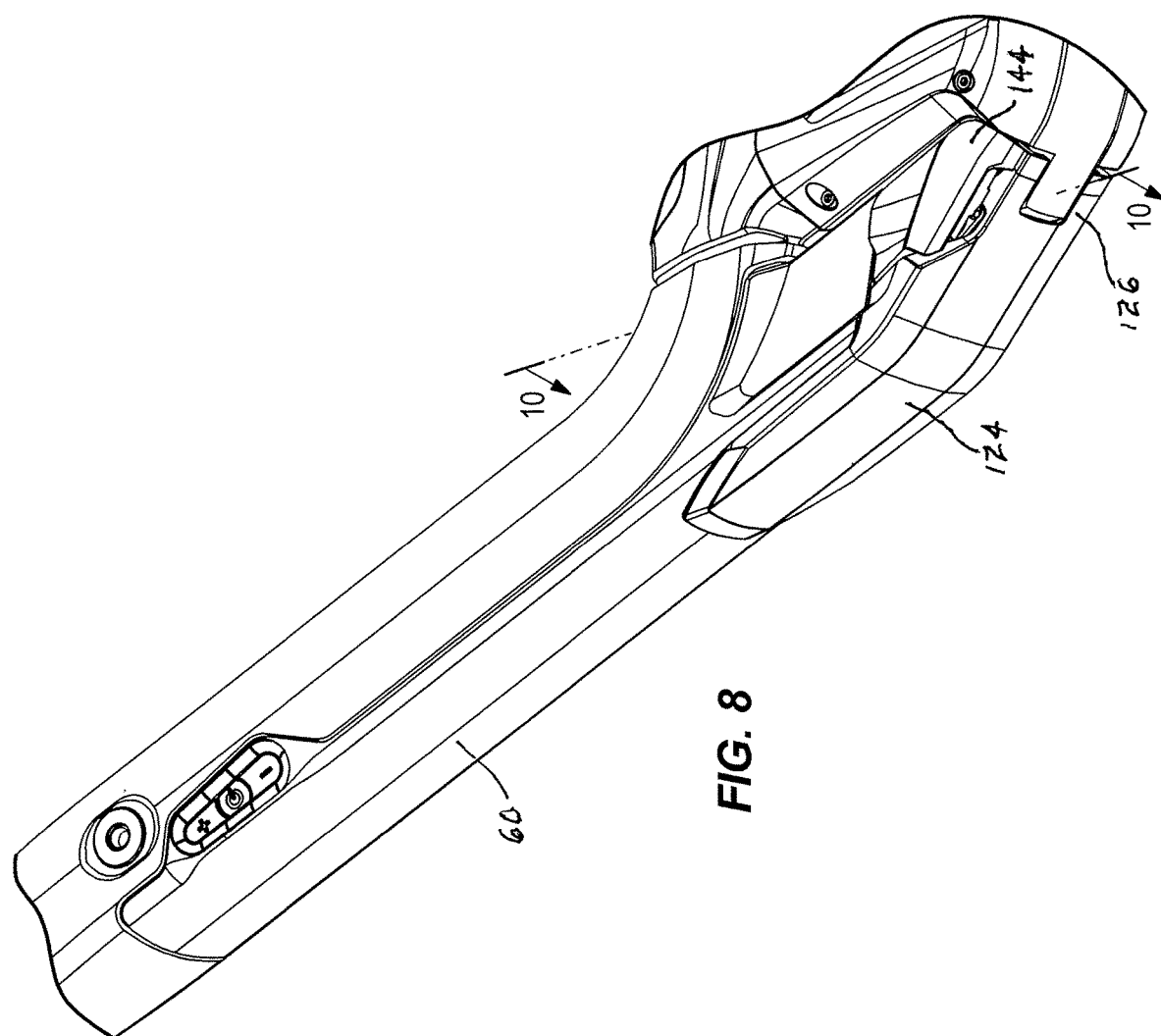
FIG. 8 is a perspective view of the battery in a fully-attached position.

Referring to FIG. 3, the illustrated battery 60 includes an upper battery mount 102 and a lower battery mount 104 that facilitates securing the battery 60 to the bicycle frame 30 at an upper frame mount 106 and a lower frame mount 108, respectively. When attaching the battery 60 to the frame 30, the lower battery mount 104 is first engaged with the lower frame mount 108 with the battery 60 in a partially attached position, as shown in FIG. 7. The battery 60 is then pivoted upwardly toward the frame 30 to a fully attached position, as shown in FIG. 8 and described below in more detail.

Figure 9:
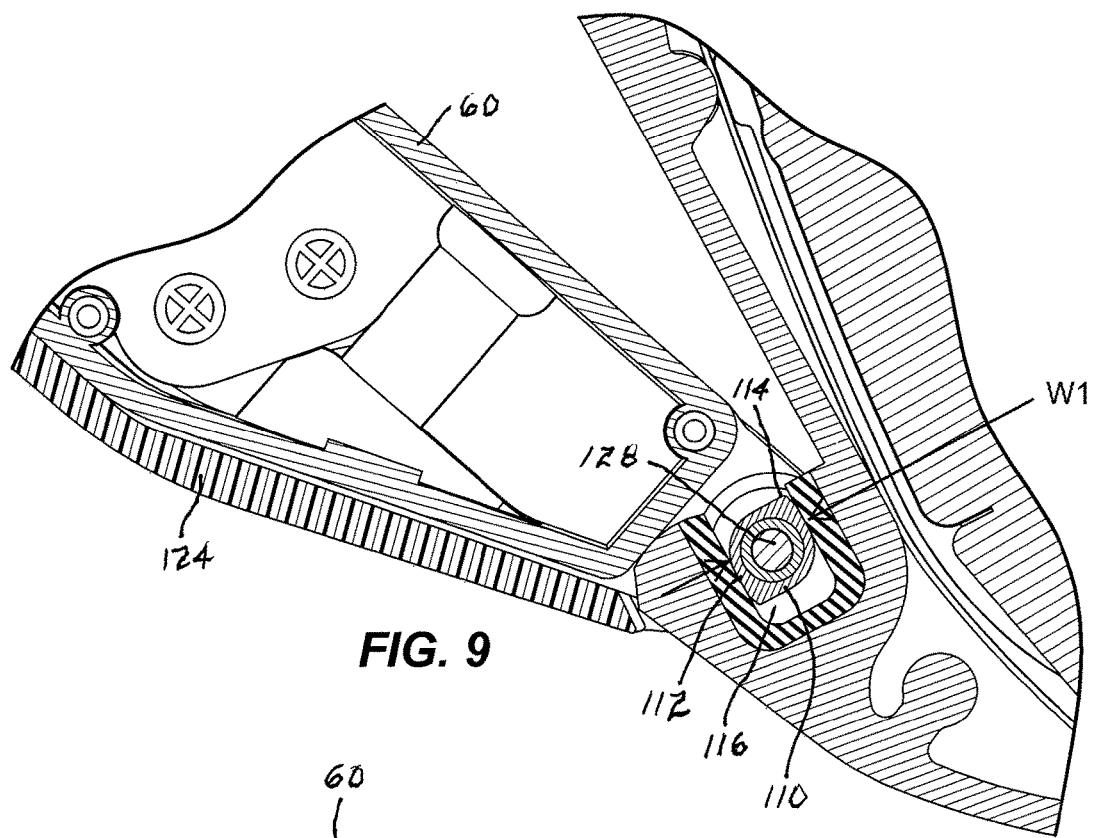
FIG. 9 is a section view taken along line 9-9 of FIG. 7 showing the lower battery mount engaged with the lower frame mount with the battery in the partially-attached position of FIG. 7.

The lower battery mount 104 and lower frame mount 108 define a pivot interface between the battery 60 and the frame 30. In the illustrated embodiment, the lower battery mount 104 comprises an eccentric boss 110 adapted to engage the lower frame mount 108. In the embodiment shown in FIGS. 9 and 10, the eccentric boss 110 comprises an elongated shaft having a cam profile with a low point 112 defining a first boss width W1 and a high point 114 defining a second boss width W2 larger than the first boss width. As the battery 60 is pivoted from the partially attached position of FIG. 7 to the fully attached position of FIG. 8, the cam profile of the eccentric boss 110 will be rotated with the battery 60 to present different profiles of the eccentric boss 110 to the lower frame mount 108, as described below in more detail.

Figure 10:
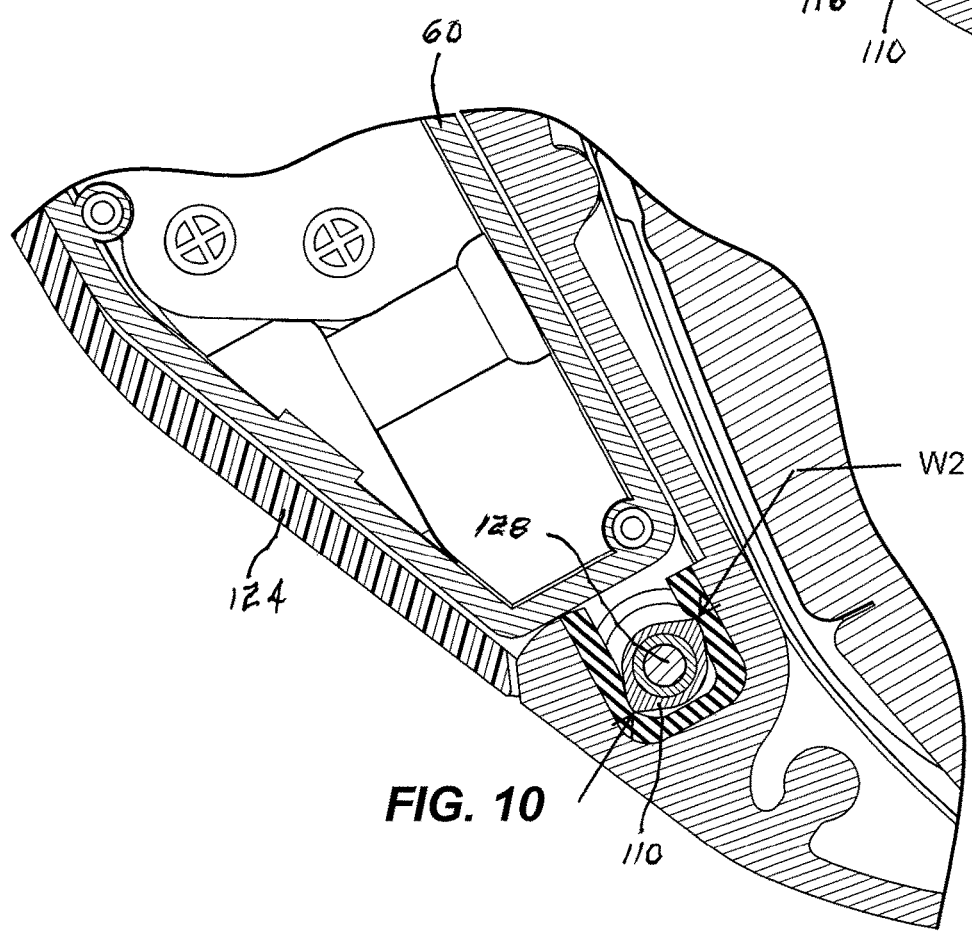
FIG. 10 is a section view taken along line 10-10 of FIG. 8 with the battery in the fully-attached position of FIG. 8.
Figure 11:
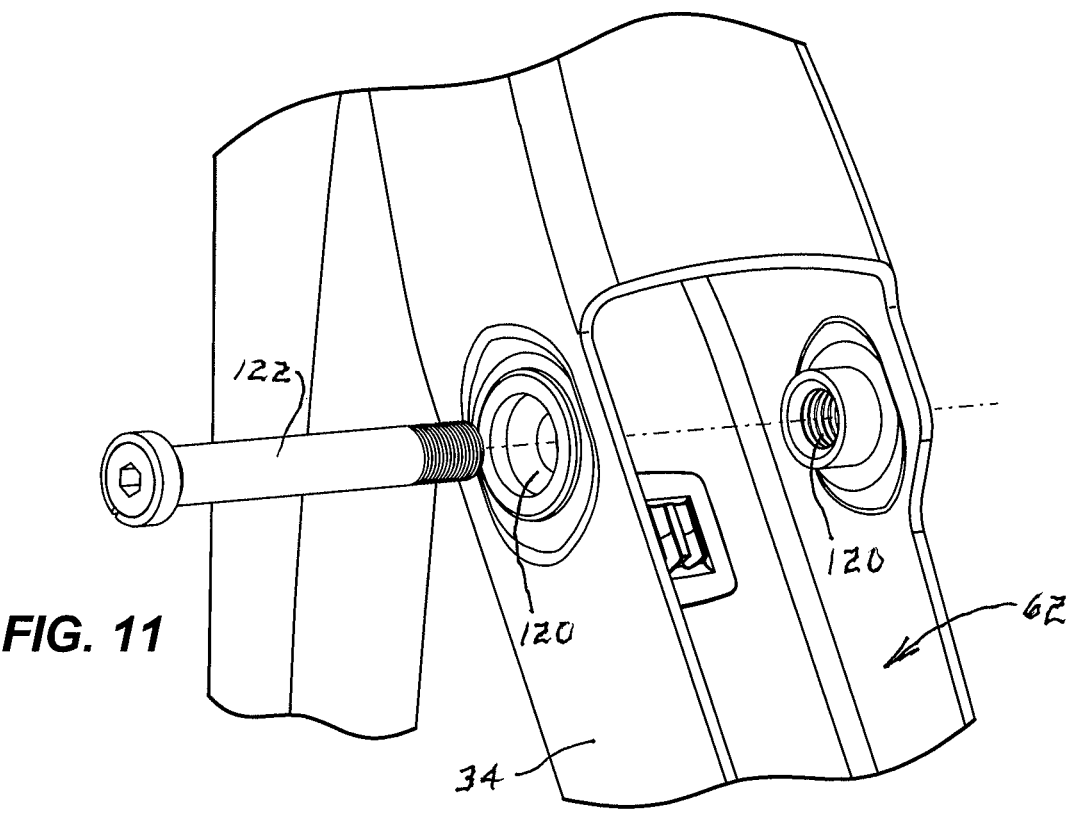
FIG. 11 is an enlarged perspective view of an upper frame mount prior to installation of the battery.
Figure 12:
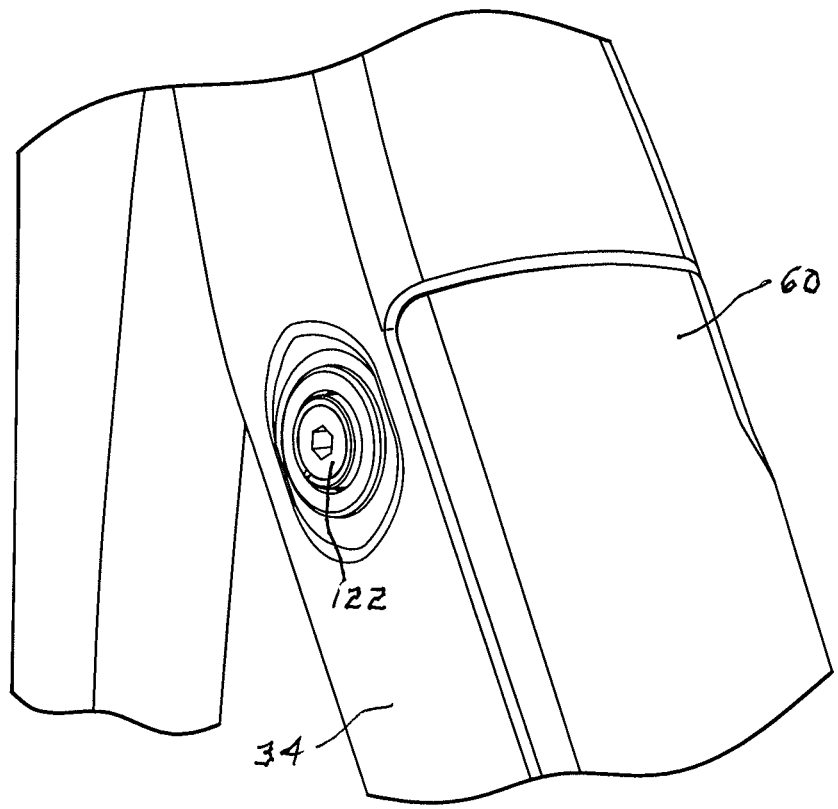
FIG. 12 is the perspective view of FIG. 11 with the battery in the fully-attached position of FIG. 8.

The illustrated lower frame mount 108 defines a depression in the form of a slot 116 that is dimensioned to receive the eccentric boss 110. With specific reference to FIGS. 9 and 10, the slot 116 has a width that is dimensioned to easily receive the first boss width W1 of the eccentric boss 110. This is the orientation of the eccentric boss 110 that will be presented to the lower frame mount 108 when the battery 60 is in the partially attached position of FIGS. 7 and 9. As the battery 60 is rotated to the fully attached position, the cam profile of the eccentric boss 110 is rotated such that the second boss width W2 of the eccentric boss 110 is presented to the slot 116 of the lower frame mount 108, thereby wedging the eccentric boss 110 in the lower frame mount 108, as shown in FIGS. 8 and 10. In order to facilitate this interference fit, the lower frame mount 108 is resilient (e.g., made from a resilient material such as polyurethane or resiliently mounted, such as spring-biased). By virtue of this arrangement, the lower battery mount 104 will be held securely to the lower frame mount 108 with reduced likelihood of any rattling occurring due to shocks or vibrations. In addition, the resilient slot 116 configuration of the lower frame mount 108 will inherently accommodate slight differences in battery 60 lengths. It should be understood that the positions of the eccentric boss 110 and depression could be reversed (i.e., the depression could be positioned on the battery 60 and the eccentric boss 110 could be positioned on the frame 30). In addition, the eccentric boss 110 could be made of a resilient material instead of or in addition to the lower frame mount 108.

As best seen in FIGS. 7-8 and 11-12, the upper battery mount 102 comprises a battery hole 118 extending all the way through the battery 60, and the upper frame mount 106 includes tube holes 120 through the left and right walls of the down tube 34 adjacent an upper end of the tube recess 62. With the battery 60 in the fully attached position of FIG. 8, the battery hole 118 of the upper battery mount 102 will be aligned with the tube holes 120 of the upper frame mount 106, and a battery mounting pin 122 can be inserted through the aligned tube holes 120 and battery hole 118 to secure the battery 60 in the fully attached position. In the illustrated embodiment, one of the tube holes 120 is threaded and an end of the battery mounting pin 122 is similarly threaded to secure the mounting pin in place.

With specific reference to FIGS. 3, 7 and 8, the illustrated bicycle 20 further includes a rock guard 124 secured to and removable from a lower end of the battery 60. The rock guard 124 includes a forked end 126 adapted to fit on opposing sides of the lower battery mount 104. In the illustrated embodiment, the forked end 126 of the rock guard 124 is secured to the battery 60 by the same battery fastener 128 that secures the eccentric boss 110 to the battery 60, as best shown in FIG. 3. The rock guard 124 further includes two threaded openings (not shown) facing the battery 60 and adapted to receive fasteners (not shown) that can be inserted through holes in the battery 60 and threaded into the threaded openings 98 in the rock guard 124 to further secure the rock guard 124 to the battery 30. By virtue of this arrangement, the rock guard 124 provides protection to the lower end of the battery 60 and can be easily replaced if damaged.

Figure 13:
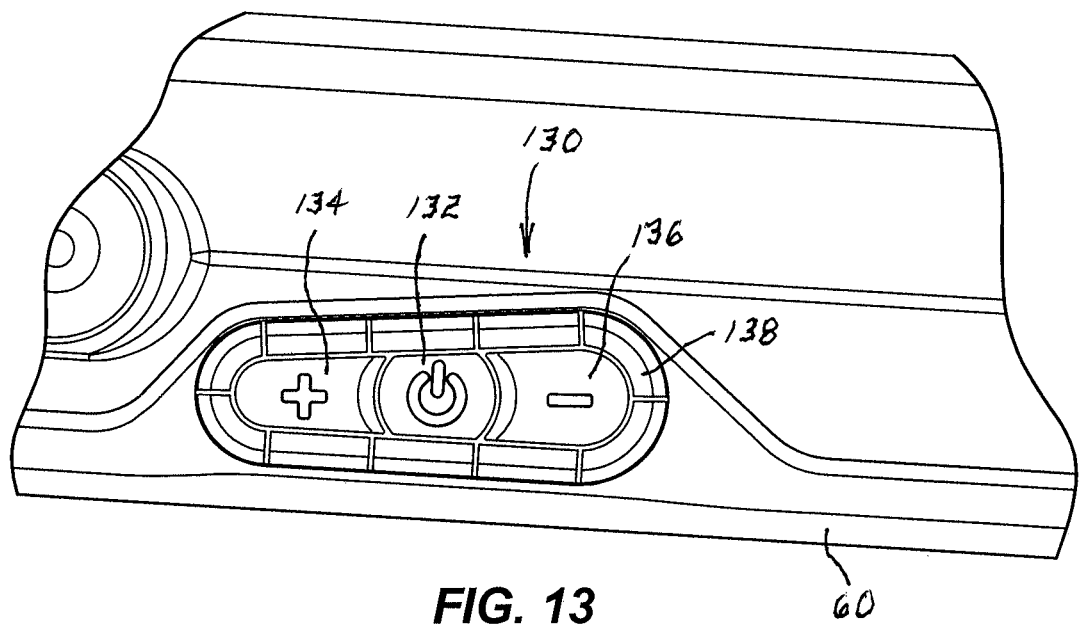
FIG. 13 is an enlarged view of a battery control panel on the battery.

The battery 60 further includes a battery control panel 130 that facilitates control of the operation of the battery 60, best seen in FIG. 13. Specifically, the battery control panel 130 includes a power button 132, a plus button 134 and a minus button 136. These buttons can be used to power the battery 60 on and off and also to select different modes of the battery 60. The battery control panel 130 further includes a series of perimeter lights 138 that indicate the battery charge.

Figure 14:
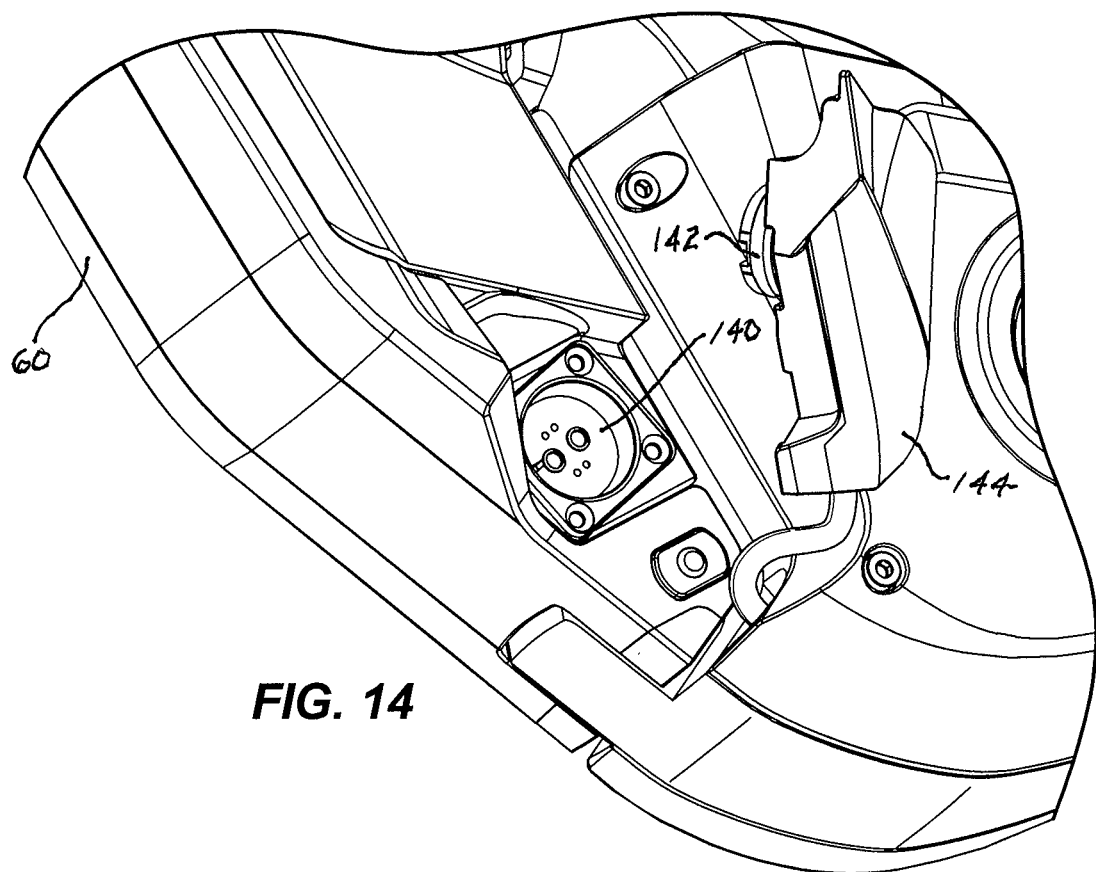
FIG. 14 is an enlarged perspective view of a battery connector on the battery.

Referring to FIG. 14, the battery 60 further includes a battery connector 140 on the left side of the battery 60 near the lower battery mount 104. The illustrated battery connector 140 can be used both to charge the battery 60 (e.g., with an appropriate charger, not shown) and also to provide connection to the electric motor 52 via a motor connector 142 wired to the electric motor 52. The illustrated motor connector 142 includes an overmolded housing 144 that fits into and is flush with the surrounding surfaces.

Figure 15:
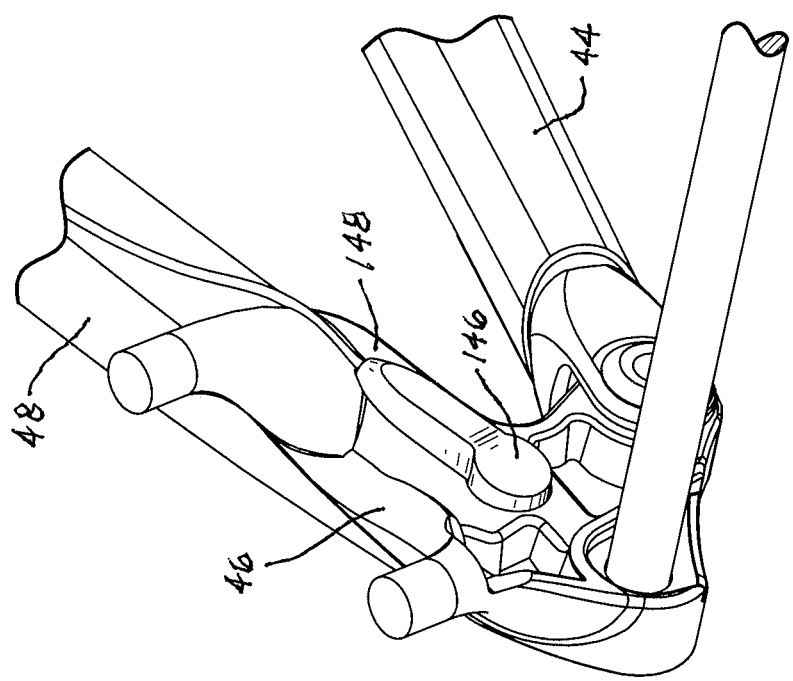
FIG. 15 is an enlarged perspective view of a speed sensor.

The illustrated bicycle 20 further includes a speed sensor 146 secured to an inner face 148 of the left rear wheel 24 support, as illustrated in FIG. 15. The speed sensor senses the rotation of the rear wheel 24, and this information can be used to calculate the speed of the bicycle 20. By virtue of this positioning, the speed sensor 146 is protected from damage and is further not visible from the left side of the bicycle 20, thus improving aesthetics of the bicycle 20.

Figure 16:
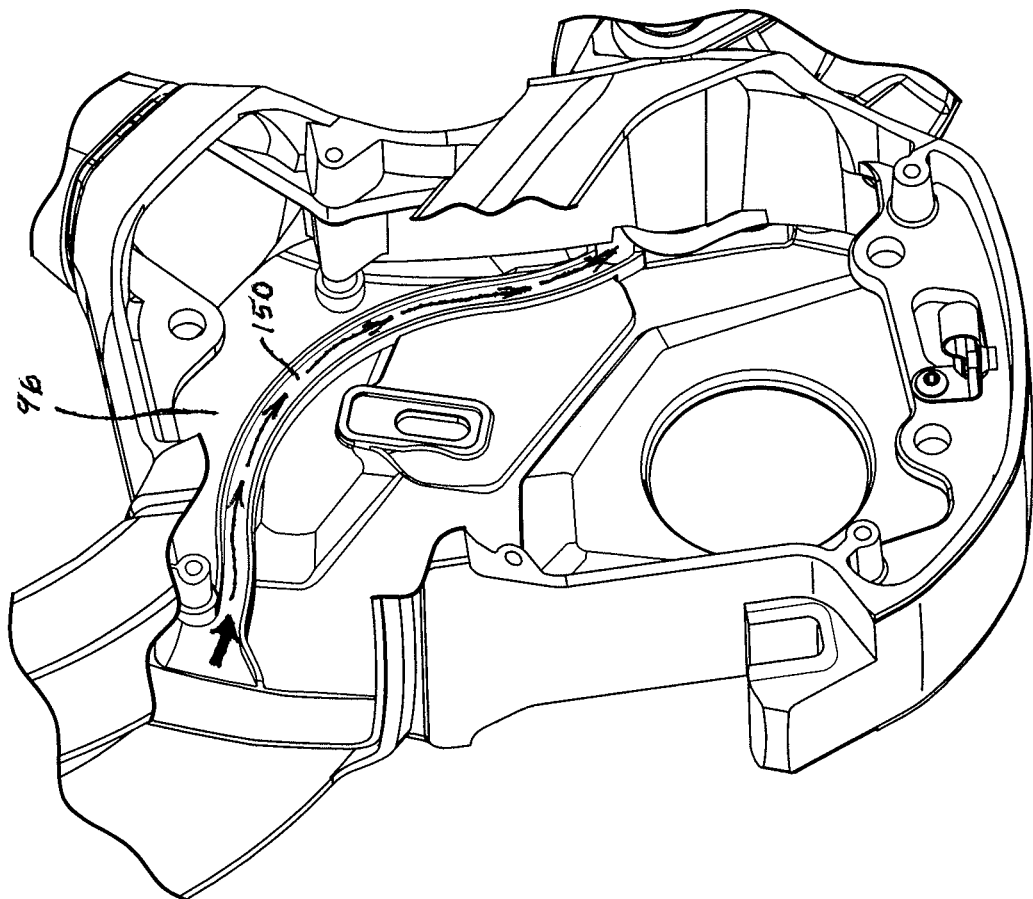
FIG. 16 is an exploded view of a right motor cover with an integrated cable channel.

Referring to FIG. 16, the inside surface of the right cover 96 includes an integral cable channel 150 that facilities routing of a cable through the motor mount 40. More specifically, with the right cover 96 secured to the motor mount 40, the cable channel 150 will be positioned against the electric motor 52, thereby creating a substantially enclosed passageway. With this substantially enclosed passage way, a cable or housing can be inserted into the passage way from the down tube 34 (see arrows in FIG. 16) and pushed until it exits adjacent the chainstay mount. This arrangement avoids the need to remove the right cover 96 when threading a new cable or housing through the motor mount 40.

Various features and advantages of the invention are set forth in the following claims.

The invention claimed is:

1. A bicycle comprising:
   front and rear wheels;
   a frame supported on the front and rear wheels and including a frame mount;
   a battery including a battery mount engaged with the frame mount,
   wherein one of the battery mount and the frame mount includes a depression and the other of the battery mount and the frame mount includes a boss positioned in the depression, the depression designed to receive the boss at multiple locations to accommodate slight differences in a length of the battery, and wherein the depression comprises a slot and the slot comprises a resilient material to securely hold the boss.

2. A bicycle as set forth in claim 1, wherein the boss comprises an eccentric boss.

3. A bicycle as set forth in claim 2, wherein the eccentric boss has a first boss width that is insertable into the depression when the battery is in a first orientation, and the boss further has a second boss width larger than the first boss width and creating an interference fit with the depression when the battery is in a second orientation, wherein at least one of the boss and the depression is resilient in order to accommodate the interference fit.

4. A bicycle as set forth in claim 1, wherein the battery mount is positioned adjacent one end of the battery, wherein an opposite end of the battery includes an opening, and wherein the bicycle further comprises a mounting pin positioned through the opening and through a portion of the frame to secure the opposite end of the battery to the frame.

5. A bicycle as set forth in claim 4, wherein a distance from the opening to the battery mount defines the length of the battery.

6. A bicycle as set forth in claim 1, wherein the battery mount comprises the boss and the frame mount comprises the depression.

7. The bicycle of claim 1, wherein the depression defines an opening configured to receive the boss, and wherein one of the battery and the frame at least partially encloses the opening.

8. The bicycle of claim 7, wherein the battery at least partially encloses the opening.

9. A bicycle comprising:
   front and rear wheels;
   a frame supported on the front and rear wheels and including a frame mount;
   a battery including a battery mount engaged with the frame mount,
   wherein one of the battery mount and the frame mount includes a depression and the other of the battery mount and the frame mount includes an eccentric boss positioned in the depression,
   wherein the eccentric boss has a first boss width that is insertable into the depression when the battery is in a first orientation, and the boss further has a second boss width larger than the first boss width and creating an interference fit with the depression when the battery is in a second orientation, wherein the depression defines an opening configured to receive the boss, wherein one of the battery and the frame at least partially encloses the opening, and wherein at least one of the boss and the depression is resilient in order to accommodate the interference fit.

10. A bicycle as set forth in claim 9, wherein the battery mount and the frame mount define a pivot interface between the battery and the frame such that the battery is pivotable relative to the frame from the first orientation to the second orientation.

11. A bicycle as set forth in claim 9, further comprising a front fork supported by the front wheel, wherein the frame includes a head tube rotationally coupled to the front fork and a down tube extending from the head tube, and wherein the frame mount is disposed within a recess in the down tube.

12. A bicycle as set forth in claim 9, wherein the battery mount is positioned adjacent one end of the battery, wherein an opposite end of the battery includes an opening, and wherein the bicycle further comprises a mounting pin positioned through the opening and through a portion of the frame to secure the opposite end of the battery to the frame when the battery is in the second orientation.

13. A bicycle as set forth in claim 9, further comprising a guard removably coupled to the battery.

14. The bicycle of claim 13, wherein the guard includes a forked end engaged with opposite sides of the battery mount.

15. The bicycle of claim 9, wherein the battery at least partially enclose the opening.

16. A bicycle comprising:

front and rear wheels;

a frame supported on the front and rear wheels and including a frame mount;

a battery including a battery mount engaged with the frame mount, wherein one of the battery mount and the frame mount includes a depression and the other of the battery mount and the frame mount includes a boss positioned in the depression, the depression designed to receive the boss at multiple locations to accommodate slight differences in a length of the battery, wherein the boss comprises an eccentric boss, wherein the eccentric boss has a first boss width that is insertable into the depression when the battery is in a first orientation, and the boss further has a second boss width larger than the first boss width and creating an interference fit with the depression when the battery is in a second orientation, and wherein at least one of the boss and the depression is resilient in order to accommodate the interference fit.

17. A bicycle comprising:

front and rear wheels;

a frame supported on the front and rear wheels and including a frame mount;

a battery including a battery mount engaged with the frame mount;

a guard removably coupled to the battery, wherein the guard includes a forked end engaged with opposite sides of the battery mount, wherein one of the battery mount and the frame mount includes a depression and the other of the battery mount and the frame mount includes an eccentric boss positioned in the depression, wherein the eccentric boss has a first boss width that is insertable into the depression when the battery is in a first orientation, and the boss further has a second boss width larger than the first boss width and creating an interference fit with the depression when the battery is in a second orientation, wherein the depression defines an opening configured to receive the boss, and wherein one of the battery and the frame at least partially encloses the opening.

* * * * *